Patented Apr. 30, 1946

2,399,285

UNITED STATES PATENT OFFICE 2,399,285

NOVEL COMPOSITION OF MATTER

Irving E. Muskat and Franklin Strain, Akron, Ohio, assignors to Pittsburgh Plate Glass Company, Pittsburgh, Pa., a corporation of Pennsylvania No Drawing. Application September 5, 1941, Serial No. 409,692

1 Claim. (Cl. 260—484)

This invention relates to a new group of unsaturated esters having very valuable properties. The new esters contain at least one terminal group derived from an unsaturated monobasic acid and at least one unsaturated group derived from an unsaturated monohydric alcohol. These esters contain at least three ester linkages between an unsaturated acid group and an unsaturated alcohol group. The compounds may contain as many as ten ester linkages in a molecule. However, the more important modifications usually contain less than six ester linkages. In all cases, however, the new compounds are definite chemical compounds having distinct melting and boiling points and are not to be confused with alkyd resins which always contain an indefinite and non-uniform number of ester linkages in a single composition.

Because some of the esters contemplated in the broader aspect of this invention are very complex and defy conventional systems of nomenclature, it has been necessary to name the esters in terms of their molecular constituents. Thus, an ester of an unsaturated monohydric alcohol, an unsaturated monobasic acid and an hydroxy acid is a compound having the nucleus of the hydroxy acid which has at least one hydroxy group esterified with the unsaturated monobasic acid and at least one acid group esterified with unsaturated monohydric alcohol.

It has been necessary to use terminology which distinguishes between hydroxy acids which contain ester linkages between the unsaturated functional groups and those which do not contain ester linkages. Accordingly, the expression "simple hydroxy acid" has been used to designate the hydroxy acids which do not contain the ester groups. Such hydroxy acids are glycolic, lactic, hydroxy butyric, leucinic, valerolactinic, hydracrylic, glyceric, acetonic, ricinoleic, saccharinic, tartaric, citric, dihydroxy maleic, salicylic, isomalic, oxalacetic, phloritic, citromalic, gallic, coumaric, malic, tartronic, resorcylic, hydroxy phthalic, meliotic, itamalic, etc., acids. The simple hydroxy acids may contain ether groups such as in α-oxyethyl glyceric acid (C₂H₅OCH₂—CHOHCOOH)

hydroxyoxyethylacetic acid (HOC₂H₄—O—CH₂COOH)

or the compounds

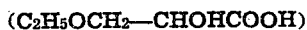

or

The simple hydroxy acids may also contain amino or thio ether linkage such as in the compounds

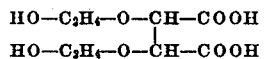

or

HO—C₂H₄—S—CH₂—COOH

The "simple hydroxy acids" do not include compounds containing ester groups between the reactive hydroxyl and acid groups. Thus, compounds such as ethylene glycol mono acid succinate (HO—C₂H₄—OCOC₂H₄COOH) lactyl lactic acid

HO—CH(CH₃)—CO—O—CH(CH₃)—COOH and the compounds of the following structures:

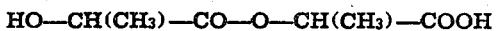

and

are not regarded as simple hydroxy acids. The expression "ester hydroxy acids" is reserved for this type of compounds.

The expression "polyhydroxy compounds" is used herein to refer to chemical compounds which contain at least two alcoholic hydroxy radicals and which do not contain any free unreacted acid groups. The term "polyhydroxy esters" is intended to be generic to the polyhydroxy compounds which contain ester linkages between a pair of hydroxy groups such as dipropylene glycol bis (lactate), ethylene glycol mono glycolate, etc. The "simple polyhydroxy compounds" are the polyhydroxy compounds which do not contain internal ester linkages between a pair of reactive hydroxy groups. For example, glycol, propylene glycol, trimethylene glycol, tetramethylene glycol, pentamethylene glycol, glycerine, pentaerythrose, glucose, lactose, maltose, sucrose, pyrogallol, are simple polyhydroxy compounds. The simple polyhydroxy compounds may contain ether linkages such as in di-, tri-, and tetra ethylene glycol, di-, tri-, tetrapropylene glycol, the polyglycerols, pp-dihydroxy diphenyl ether, etc. They may also contain thio-ether or amino linkages such as in triethanolamine, dioxyethylene sulfide, 2,5-dioxycumaron or 2,5-bis-oxymethyl furan.

The expression "polybasic acid" is used herein to refer to compounds which contain at least two reactive acid groups and which do not contain any free reactive alcoholic hydroxy groups. The expression "polyacidic ester" refers to that group of polybasic acids which contains ester linkages between a pair of acid groups such as glycol bis (acid adipate), bis (lactyl) carbonate, mono glycolyl acid oxalate, or the compound having the structure:

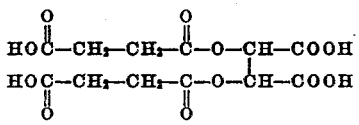

Simple polybasic acids accordingly are the compounds which do not contain the internal ester linkages between the reactive acid groups. This expression includes inorganic acids such as sulphuric, boric, silicic, metasilicic, carbonic, phosphoric, or titanic acids; the polycarboxylic acids such as oxalic, malonic, succinic, adipic, sebacic, maleic, fumaric, tricarballylic, phthalic, or diphenyl dicarboxylic acids; the ether acids such as dilactic and diglycolic acids; the corresponding thio ether acids and imino acids such as imino acetic acid $(NH(CR_2-COOH)_2)$.

An ester linkage within the intention of the present application is intended to refer to a linkage wherein an oxygen atom is linked to a pair of carbon atoms, one of which constitutes the carbon atom of a carbonyl group. Thus, a carbonate R—O—CO—OR— contains two ester linkages since it has two linking oxygen atoms both adjacent to a carbonyl group.

The compounds herein contemplated may be regarded as esters of an hydroxy acid which contains at least one but usually not more than eight, preferably not more than four ester linkages between the esterified hydroxy group and the esterified acid group and wherein the hydroxy group is esterified with an unsaturated acid and the acid group is esterified with an unsaturated alcohol. Of particular interest in this respect are esters of unsaturated aliphatic alcohols having 2-5 carbon atoms such as vinyl, allyl, methallyl, crotyl, isocrotyl, isopropenyl, propargyl, methylpropargyl, methyl vinyl carbinyl, tiglyl, ethylallyl, butadienyl, divinyl carbinyl, angelyl, esters or the halogen, nitro, amino or other substituted products of the above alcohols such as 2-chloroallyl, 2-bromoallyl, or chlorocrotyl alcohols. Although the esters of the lower molecular alcohols are preferred, the esters of other alcohols having from six to ten carbon atoms are also useful. For example, the esters of 1-hexene-1-ol, phenyl propargyl alcohol, diallyl carbinol, linalool, cinnamyl alcohol, vinyl butyl carbinol, citronellol and 2-4-hexadiene-1-ol have some utility.

The new compounds are also esters of unsaturated monobasic acids containing three to ten carbon atoms such as acrylic, crotonic, methacrylic, α-ethylacrylic, propiolic, tetrolic, pentinoic, cinnamic, phenylpropiolic, etc., or the corresponding halogen, nitro, amino, or other substituted acids such as alpha or beta chloracrylic, alpha or beta bromoacrylic and chlorocrotonic acids.

The new group of esters contain at least one radical derived from an unsaturated monobasic acid and at least one derived from an unsaturated monohydric alcohol. They may also, however, contain radicals derived from saturated alcohols such as methyl, ethyl, propyl, butyl, amyl or benzyl and the higher molecular alcohols such as cetyl, lauryl, or carnubyl alcohols. The new esters may also contain the radicals of saturated acids such as acetic, propionic, chloracetic, butyric, propionic, benzoic, lauric, palmitic, etc., acids. The esters may also contain unreacted hydroxyl and unreacted acid groups.

Many of the compounds having the following general formula:

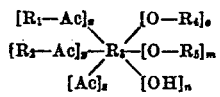

in which $R_1$ is a radical derived from unsaturated monohydric alcohol, $R_2$ is a radical derived from saturated monohydric alcohol, $R_3$ is the radical of the hydroxy acid which in its unesterified state was attached to $(x+y+z)$ acid groups and $(e+m+n)$ alcoholic hydroxy groups and which contains an internal ester linkage, $R_4$ is a radical derived from an unsaturated monobasic acid, $R_5$ is a radical derived from a saturated mono basic acid, $x$ and $e$ are small whole numbers, and $z$, $y$, $m$ and $n$ are either small whole numbers or zero.

Several distinct types of the unsaturated esters of the ester hydroxy acids are within the purview of this invention. The first type are those esters of (a) an unsaturated monohydric alcohol, (b) an unsaturated mono-basic acid and (c) an ester hydroxy acid which is a partial ester of a simple polyhydroxy compound and a simple polybasic acid.

A general modification of this first type has the structure in which a single molecule of the simple polyhydroxy compound is esterified with at least one molecule of unsaturated mono-basic acid and at least one molecule of a partial ester of an unsaturated alcohol and a simple polybasic acid. An alternative modification of the first type is the ester in which a single molecule of simple polybasic acid is esterified with at least one molecule of unsaturated alcohol and at least one molecule of a partial ester of (a) an unsaturated monobasic acid and (b) a simple polyhydroxy compound. Both of these modifications when reduced to the simplest form result in identical structures. Thus, when the simple polyhydroxy compound is a dihydroxy compound and the simple polybasic acid is a dibasic acid the unsaturated esters have the structure:

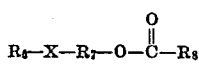

in which $R_6$ is the radical derived from an unsaturated alcohol, X is the radical which is derived from the dibasic acid, $R_7$ is an organic radical derived from the dihydroxy compound and $R_8$ is the radical attached to the carboxylic group of the monobasic unsaturated acid.

The first type compounds may be prepared by reacting an hydroxy ester of (a) an unsaturated monobasic acid and (b) a polyhydroxy compound with an acid ester of (a) unsaturated alcohols and (b) polybasic acids or with an acid chloride of such acid ester. Suitable hydroxy esters are ethylene glycol monoacrylate, glycerol diacrylate, diethylene glycol monoacrylate, pentaerythritol triacrylate, propylene glycol monoacrylate, dipropylene glycol monoacrylate, resorcinol monoacrylate, pyrogallol diacrylate, etc., and the corresponding methacrylates, crotonates, ethylacrylates, propiolates, cinnamates, etc. Suitable acid esters or acid chlorides thereof are the allyl acid phthalate, allyl phthalyl chloride, allyl acid succinate, allyl succinyl chloride, allyl acid sulphate, diallyl acid borate, diallyl tricarballylate, allyl acid maleate, allyl maleyl chloride, allyl acid diglycolate, etc., and the corresponding methallyl, crotyl, propargyl, etc., esters.

The carbonate esters may be prepared by inter-reacting the chloroformates of unsaturated alcohols with the above hydroxy esters in the presence of a basic reagent, preferably at temperatures between 0° C. and 10° C. Suitable basic reagents are the cyclic tertiary amines, such as pyridine and the inorganic alkalies such as carbonates, oxides, or hydroxides of alkali metals, alkaline earth metals and magnesium. The carbonate esters may also be made by first preparing the chloroformates of the above mentioned hydroxy esters and subsequently treating the chloroformates with unsaturated alcohols.

Other methods of preparation will be apparent from the following specific examples:

Example I

A mixture of 250 gms. of glycol monomethacrylate, 200 gms. of pyridine and 500 cc. of toluene was cooled to approximately 0° C. on an ice bath. Allyl chloroformate (235 gms.) was added slowly at a rate of about 3–4 gms. per minute while continuously agitating the reaction mass. During the reaction the temperature remained between +2 and +13° C. When the reaction was complete the mass was permitted to stand at room temperature for an hour. The toluene solution was washed with dilute hydrochloric acid solution, then with aqueous sodium carbonate solution and finally with water. The toluene was evaporated by heating under reduced pressure and the product was dried over anhydrous sodium sulphate. The resulting ester had the composition

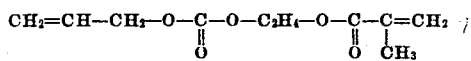

The ester readily polymerized upon heating with 2 percent benzoyl peroxide at 80° C. for one hour.

Example II

One-half mole of methallyl acid phthalate (98 gms.) prepared by the reaction of equimolar quantities of methallyl alcohol and phthalic anhydride, was mixed with 87 gms. of diethylene glycol monomethacrylate, one gram of hydroquinone and 300 cc. of benzene. The mixture was refluxed for five hours. Water was removed from the condensed benzene which was returned to the reaction vessel. The benzene solution was washed with dilute HCl solution, with aqueous $Na_2CO_3$ solution and finally with water. The solution was dried over sodium sulphate. The ester

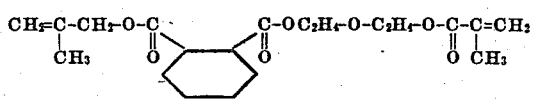

was separated from the benzene and the side reaction products by distillation.

Example III

A mixture of 146 gms. of glycerol-alpha-monoacrylate and 500 cc. of benzene was cooled to 0° C. Phosgene was bubbled through the solution at the rate of 35 millimoles per minute for one hour. The reaction temperature was maintained below +8° C. by means of a bath of an ice salt mixture. When the reaction was complete the solution was warmed to 50° C. to evolve the excess phosgene. The benzene solution of the chloroformate was then washed with water and dried over sodium sulphate. A quantity of allyl alcohol slightly in excess of two moles (120 gms.) was mixed with a substantial excess of pyridine (200 gms.). The chloroformate solution was added slowly to the pyridine-alcohol mixture over a period of one hour while maintaining the temperature below 10° C. by artificial cooling. The benzene solution was washed with water to free it of unreacted alcohol. The benzene was evaporated by heating the solution under reduced total pressure. The ester was believed to have the structure:

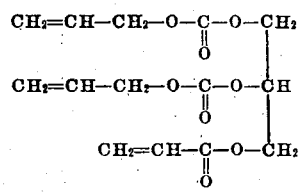

A 25 gm. sample of the ester was dissolved in 100 cc. of benzene and mixed with 2 percent benzoyl peroxide. Two hours of heating at 80° C. caused a substantial increase in viscosity. The benzene solution was then poured into 300 cc. of methyl alcohol. A quantity of colorless solid fusible polymer was precipitated. This polymer was mixed with 5 percent benzoyl peroxide, placed in a mold and cured at 100° C. at a pressure 3000 pounds per square inch whereby a transparent, substantially infusible polymer was secured.

A second type of unsaturated ester is the ester of (a) an unsaturated monohydric alcohol, (b) an unsaturated monobasic acid and (c) an ester hydroxy acid which is comprised of two molecules of the same or different simple hydroxy acids.

A preferred modification of this second type is that in which the hydroxy acids are monohydric and monoacidic. These compounds will have the molecular structure:

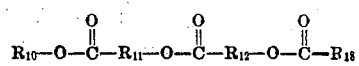

in which $R_{10}$ is the radical derived from unsaturated alcohol, $R_{11}$ and $R_{12}$ the radicals attached to the hydroxy and carboxylic groups of the hydroxy acid and $R_{13}$ is the radical attached to the carboxyl group of the unsaturated acid.

The second type ester may be prepared by inter-reacting unsaturated alcohol esters of simple hydroxy acids with the esters of (a) an unsaturated monobasic acid and (b) a simple hydroxy acid. The same esters may also be prepared by reacting an unsaturated monohydric alcohol ester of a halogen substituted acid with an alkali metal or silver salt of an acid ester of (a) a simple hydroxy acid and (b) an unsaturated monobasic acid. Suitable acid esters are the acrylates, methacrylates, crotonates, ethylacrylates, etc., of lactic acid, glycolic acid, salicylic acid, hydracrylic acid, α-hydroxy butyric acid, etc.

A preferred method of preparing the second type esters utilizes the dimers of the simple hydroxy acids such as lactyl lactic acid, glycolyl glycolic acid or salicylyl salicylic acid. These dimers may be successively esterified with an unsaturated alcohol and an unsaturated acid, or a salt of the dimer may be reacted with an unsaturated monobasic acid and the resulting product then treated with an unsaturated hydrocarbon halide.

Other methods of preparation will be apparent from the following examples:

*Example IV*

150 gms. of lactyl lactic, 60 gms. of methallyl alcohol, 2 gms. of pyrogallol, and 500 cc. of toluene were refluxed for four hours. The toluene and water evaporated were separated and the toluene returned periodically to the reaction vessel. After four hours substantially no more water was evolved. 90 gms. of pyridine were added and the mixture then cooled to $+2°$ C. While continually maintaining the reaction temperature below $+10°$ C., 100 gms. of acrylyl chloride were slowly added over a period of one hour. When the reaction was completed the benzene solution containing substantially quantities of methallyl acrylate and another ester with the structure:

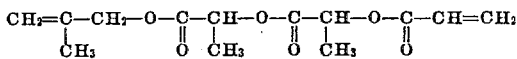

as well as minor quantities of other reaction products. The new ester was purified by distillation in a vacuum.

A quantity of the ester was mixed with 3 percent acetone peroxide, and heated for one hour at 90° C. A hard, brittle product was produced.

A third type of unsaturated ester comprises the esters of (a) an unsaturated monohydric alcohol, (b) an unsaturated monobasic acid and (c) an ester hydroxy acid which comprises an ester of a molecule of simple polybasic acid, a molecule of simple polyhydroxy compound and a molecule of a simple hydroxy acid. The preferred modifications of these in which the polyhydroxy compound, the polybasic acid and the hydroxy acid are difunctional includes three types of esters depending upon the relative position of the molecular units. These modifications of the third type may be written structurally:

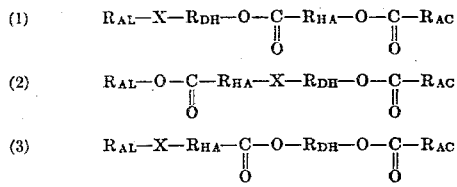

in which $R_{AL}$ is the radical derived from unsaturated monohydric alcohol, $X$ is the radical from dibasic acid, $R_{HA}$ is the radical attached to the acid and hydroxyl groups of the hydroxy acid, $R_{DH}$ is the radical attached to the hydroxyl groups of the dihydroxy compound and $R_{AC}$ is the radical attached to the acid group of the unsaturated monobasic acid.

The first of the three modifications of the third type of unsaturated esters may be prepared from the unsaturated acid esters of simple hydroxy esters such as the acrylic, methacrylic or crotonic, etc., esters of lactic, glycolic, salicylic, and hydroxy butyric acids. These acid esters may be prepared by various methods such as by reaction with thionyl chloride or phosphorous pentachloride to produce the corresponding acid chlorides. The acid chlorides are then reacted in the presence of alkaline reagents with hydroxy esters which are produced either by reacting unsaturated alcohol acid esters or dibasic acids with alkylene oxides or by reacting alkali or silver salts of the unsaturated acid esters with alkylene chlorhydrins. Suitable hydroxy esters can be prepared by reacting allyl acid phthalate, allyl acid diglycolate, allyl acid adipate, allyl acid succinate, allyl acid sulphate, and the corresponding methallyl, crotyl, cinnamyl, etc., esters with alkylene oxides such as ethylene oxide or propylene oxide. The same hydroxy esters may be prepared by reacting the alkali or silver salts of the unsaturated alcohol acid ester of dibasic acids with alkylene chlorhydrin such as ethylene chlorhydrin, propylene chlorhydrin, or other chlorohydroxy substituted hydrocarbon. The same esters may be prepared by reacting the acid chloride of partial esters of polybasic acid and unsaturated alcohol, such as allyl phthalyl chloride, allyl succinyl chloride or allyl adipyl chloride with hydroxy esters such as glycol mono (lactyl methacrylate), glycol mono (glycolyl methacrylate), and the corresponding acrylates, crotonates, etc., and the compounds of diethylene glycol, propylene glycol, tetramethylene glycol, etc.

The carbonate esters of this modification may be readily prepared by reacting the hydroxy ester of a glycol and an unsaturated ester of a simple hydroxy acid with a chloroformate of an unsaturated alcohol in the presence of an alkaline agent. Suitable hydroxy esters may be prepared by reacting lactyl methacrylate, glycolyl methacrylate, salicylyl methacrylate, etc., or the corresponding acrylates, crotonates, etc., with alkylene oxides, such as ethylene or propylene oxides. The carbonates may also be prepared from these hydroxy esters by reacting first with phosgene and subsequently with unsaturated alcohol.

The second modification of the third type of unsaturated ester may be prepared by first reacting the monesters of glycols or polyglycols such as ethylene glycol monomethacrylate, diethylene glycol monomethacrylate, propylene glycol monomethacrylate, etc., or the corresponding acrylates, crotonates, etc., with anhydrides of dibasic acids such as phthalic, succinic, or adipic anhydrides and then reacting the alkali metal or silver salt of the resulting acid ester with an unsaturated alcohol ester of a monobasic halogen substituted aliphatic acid such as allyl chloroacetate, allyl α-chlorpropionate, allyl α-bromobutyrate, etc., or the corresponding methallyl, crotyl, ethyl allyl, etc., esters. These esters may also be prepared by reacting acid chlorides of acids such as phthalyl acid lactyl acrylate, succinyl acid lactyl acrylate, or adipyl acid lactyl acrylate, etc., with hydroxy esters such as ethylene glycol monomethacrylate.

The carbonate esters of this second modification may be prepared by reacting unsaturated alcohol esters of simple hydroxy acids with chloroformates of monoesters of glycols or polyglycols and unsaturated acids. Alternatively, the same esters may be prepared by treating an unsaturated alcohol ester of simple hydroxy acids such as allyl lactate with phosgene to produce the corresponding chloroformate. This chloroformate may be reacted with a monoester of a glycol or polyglycol and an unsaturated monobasic acid.

The third modification of this third type may be prepared by reacting mixed esters such as glycol monomethacrylate, monolactate, glycol monocrotonate, monoglycollate, glycol mono-ricinoleate, monoacrylate, etc., with a partial ester of an unsaturated alcohol and a polybasic acid or acid halide thereof such as allyl acid phthalate, allyl phthalyl chloride, allyl acid succinate, allyl succinyl chloride, allyl maleyl chloride, allyl acid maleate, or the corresponding methallyl, vinyl, crotyl, etc., derivatives. The third modification of the third type may also be prepared from monoesters of glycols and unsaturated acid such as ethylene glycol monoacrylate, diethylene glycol monoacrylate, propylene glycol monoacrylate, etc., or the corresponding methacrylates, crotonates, chloracrylates, etc. These mono esters are then treated with an acid chloride of a halogen substituted monocarboxylic acid. The resulting compound is finally reacted with an alkali or silver salt of an unsaturated alcohol acid ester of a dibasic acid such as allyl silver phthalate, allyl silver diglycolate, allyl silver sulphate, etc., or the corresponding methallyl, crotyl, cinnamyl, etc. esters.

The carbonate esters of the third modification may be prepared by reacting the chloroformate of an unsaturated alcohol with an hydroxy ester such as glycol lactate methacrylate, diethylene glycol lactate, methacrylate, propylene glycol lactate methacrylate, etc., or the corresponding acrylate, crotonates, or the corresponding glycolates, leucinates or ricinoleates. The same hydroxy esters may be treated with phosgene to prepare the chloroformates which are subsequently reacted with unsaturated alcohol.

The third type ester is not limited to difunctional simple constituents. It will be apparent that the corresponding esters of trihydric or other polyhydric alcohols may be prepared by reacting compounds such as glycerol, diacrylate, erythritol tri- or diacrylate, or any acrylate of the various tetroses, hexoses, etc., or the corresponding chloracrylate or methacrylate with the chloroformate of allyl lactate, allyl glycolate, allyl ricinoleate or the corresponding vinyl, methallyl, etc., esters. Similarly, polycarboxylic hydroxy acid esters such as diallyl malate, triallyl citrate, diallyl tartronate, diallyl citromalate, etc., or the corresponding methallyl, vinyl, chlorallyl, etc., esters may be reacted with the chloroformates of glycol monomethacrylate, propylene glycol monomethacrylate, glycerol dimethacrylate, etc., and the corresponding acrylates, chloracrylates, propiolates, etc. Similarly, the acid chlorides of partial esters of simple polybasic acids may be reacted with unsaturated hydroxy esters such as glycol lactate acrylate, propylene glycol lactate acrylate, diethylene glycol lactate acrylate, etc., and the corresponding glycolates, alpha butyrates, leucinates, salicylates, etc., and the corresponding methacrylate, chloracrylate, etc.

*Example V*

Lactyl methacrylate (80 gms.) was mixed with 65 gms. of thionyl chloride and 1 gm. of CuO. The reaction proceeded slowly in the cold mixture but soon the evolution of gas subsided. The mixture was heated to the extent required to promote a continued reaction. The temperature was raised gradually and finally the mixture was heated for two hours at 60–65° C. The excess of thionyl chloride was then boiled off by raising the temperature to 80° C. The acid chloride of lactyl methacrylate was thereby produced.

In a separate reaction vessel 105 gms. of allyl acid phthalate was treated with 25 gms. of ethylene oxide by bubbling the gaseous $C_2H_4O$ through a benzene solution (300 cc.) of the acid ester. The solution was then cooled to 0° C. and 50 gms. of pyridine were added. The acid chloride of lactyl methacrylate was then added slowly over a period of an hour while the temperature was maintained below 10° C. The benzene solution was then washed with dilute HCl solution with $Na_2CO_3$ solution and with water. It was dried over anhydrous sodium sulphate. The benzene was separated from the ester by heating under reduced pressure. The ester was believed to have the structure:

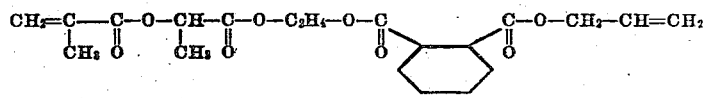

A five gram sample was heated at 85° C. with 5 percent benzoyl peroxide for one hour. A hard, nearly transparent product was formed.

*Example VI*

Equal molar quantities of alpha-hydroxybutric acid (100 g.) and acrylic acid (70 gms.) were esterified by heating for two hours at 80–85° C. in the presence of 1 gm. of p-toluenesulphonic acid and 1 gm. hydroquinone. When the reaction was substantially completed the crude ester was diluted with 200 cc. ether and cooled. Ethylene oxide was bubbled through the reaction flask at a rate of approximately 1 gm. per minute. After an hour the addition was discontinued and the ester was washed with 50 cc. dilute $Na_2CO_3$ until neutral. It was then dried over $Na_2SO_4$ and distilled at 2 mm. total pressure.

The ester was mixed with 80 gms. of pyridine and cooled to approximately 0° C. 60 gms. of allyl chloroformate were then slowly added at a rate just sufficient to permit the continual maintenance of the reaction temperature below 10° C. The resulting ester was freed of volatile impurities by heating for 10 minutes at 85–90° C. at 5–10 mm. total pressure. The ester was believed to have the structure:

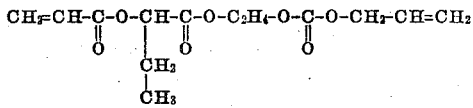

The ester was polymerized readily in the presence of 4 percent benzoyl peroxide at 80° C. to form a hard brittle solid.

*Example VII*

65 gms. of adipic anhydride, 60 gms. of propylene glycol monoacrylate and 1.5 gms. pyrogallol were mixed and heated to 120° C. for 4 hours. The mixture was dissolved in 500 cc. of ethyl alcohol and 85 gms. of silver nitrate solution was added. The silver salt glycol acrylate acid adipate was precipitated. The silver salt was separated by filtration.

A solution of 75 gms. of methallyl chloroacetate in 500 cc. of benzol was prepared. The solid silver salt was added and the mixture heated at the reflux temperature for 3 hours. When the reaction was completed the solid silver chloride was filtered off. The benzene solution was washed with water and dried over sodium sulphate. The benzene was removed by distillation. The resulting ester had the structure:

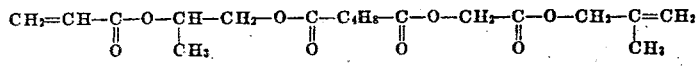

A five gm. sample of the unsaturated ester was heated at 75° C. for one hour in the presence of two percent lauryl peroxide. A hard, colorless product was produced.

Example VIII

Equal molar quantities of trimethylene glycol (76 gms.) alpha chloracrylic acid (107 gms.), and 1 gm. of hydroquinone were dissolved in 500 cc. benzol and the mixture refluxed for 4 hours, removing $H_2O$ as an azeotropic mixture. The resulting solution of an hydroxy ester was washed with two 50 cc. portions of water and dried over sodium sulphate. The benzol solution was then cooled to 0° C. and 100 gms. of pyridine were added, 255 gms. of the chloroformate of methallyl salicylate were added gradually at a rate which permitted the reaction temperature to remain below 10° C. throughout. The addition was dropwise at first but as the reaction proceeded, a more rapid addition was possible. When the addition was completed the mixture was permitted to stand overnight at room temperature. The crude ester was washed with water and the benzol was evaporated at reduced pressure. The ester had the structure:

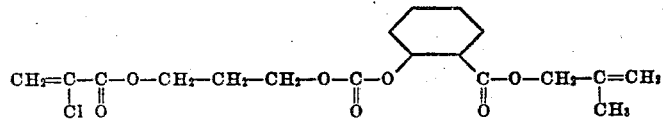

Example IX

Diethylene glycol monomethacrylate (90 gms.) and 65 gms. of the acid chloride of alpha-chloropropionic acid were reacted by slowly adding the latter to the former in the presence of an excess of pyridine and 500 cc. of benzol. The resulting ester was washed with dilute HCl solution and with water and dried over sodium sulphate.

Silver methallyl succinate was prepared by first reacting equal moles of methallyl alcohol and succinic anhydride. The partial ester was then treated with silver nitrate in alcohol solution. Silver methallyl succinate was precipitated. The solid silver salt was added to the benzene solution and the mixture was stirred vigorously for two hours. The solid silver chloride was filtered off, the benzene solution was washed with 100 cc. of water and dried over anhydrous sodium sulphate. The benzene was removed by heating under reduced pressure. The ester has the molecular structure:

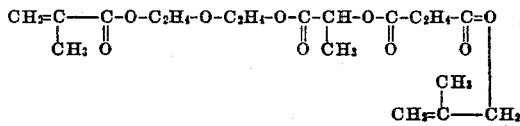

Thirty gms. of the ester was redissolved in 100 cc. of benzol and mixed with 3 percent benzoyl peroxide. The mixture was heated at reflux temperature for one hour. The viscosity of the mixture became greatly increased. The viscous solution was poured into 300 cc. of methyl alcohol. A soft gummy solid was precipitated, recovered by filtration and dried. A five-gram sample of the polymer was mixed with 5 percent benzoyl peroxide and heated at 135° C. in a mold under 2000 p. s. i. pressure. A hard, brittle polymer was produced.

Example X

Triethylene glycol (150 gms.) and alpha-chloroacrylic acid (107 gms.) were esterified by heating on a water bath for two hours in the presence of 2 gms. of hydroquinone. The ester was diluted with ether and washed with HCl and water. It was then dried over anhydrous sodium sulphate and the ether evaporated. The triethylene glycol monochloracrylate was then mixed with 90 gms. of lactic acid and the heating was continued for two hours in the presence of an additional 2 gms. of hydroquinone. The ester was washed with water and purified by distillation at 2 mm. total pressure. The resulting hydroxy ester was mixed with 500 cc. benzol and 100 gms. of pyridine. Approximately 110 gms. of crotyl chloroformate were added slowly while maintaining the temperature between +2 and +8° C. The crotyl chloroformate had been previously prepared by reacting crotyl alcohol with phosgene. The benzene solution was washed with water and dried. The ester was separated from the benzene by heating at reduced pressure. The structure of the ester was believed to be:

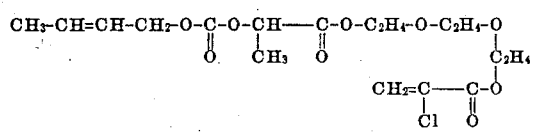

Other complex esters can be prepared. For example, unsaturated alcohol esters of polyhydroxy acids may be treated with either saturated or unsaturated chloroformates or the acid esters of polybasic acids and with unsaturated acids. Suitable unsaturated alcohol esters of polyhydroxy acids are allyl glycerate, diallyl tartrate, allyl resorcylate, allyl saccharinate, allyl gallate, and the corresponding methallyl, crotyl, butadienyl, chorallyl, or ethyl-allyl or other unsaturated esters. At least one hydroxy radical of these compounds is esterified with an unsaturated acid such as acrylic, methacrylate, chloracrylic, crotonic, etc., acids, and at least one hydroxy group is reacted with chloroformate such as methallyl, ethyl, methyl, allyl, chlorallyl, propyl, methallyl, butyl, etc., chloroformates or with acid esters such as methyl acid phthalate, methyl acid succinate, methyl acid adipate, methyl acid dilactate, etc., or the corresponding allyl, ethyl, methallyl, crotyl, propyl, etc., esters.

In general, the simpler esters are more desirable due to the ease of preparation and the higher yields. The chain structures composed of difunctional units or the short branched chain type molecules are accordingly more practicable and therefore, of greater utility. The molecules having six or more ester linkages between the unsaturated alcohol group and the unsaturated acid group have, however, similar physical and chemical properties.

The unsaturated esters described herein are generally high boiling liquids, some of which are capable of being distilled at reduced pressures. Other esters are solid at normal temperatures. Most of the liquid esters are clear, colorless, and miscible with numerous organic solvents such as acetone, alcohol, chloroform, dioxane, benzene, xylene, toluene, ethyl ether, paraffin hydrocarbons, etc. The monomeric esters are valuable as plasticizers for various resin materials, such as styrene, cellulose, vinyl, urea, protein, phenolic or acrylic resins. Other uses such as solvents, insecticides and liquid coating compositions are noteworthy.

The most important uses of the now compounds involve their polymerizability in the presence of heat or light or other catalyst to yield solid or liquid compositions of widely different physical properties. The polymerization is preferably conducted in the presence of catalysts such as oxygen, ozone, or organic peroxides such as lauryl, benzoyl and acetone peroxides.

The products of polymerization vary greatly in their physical properties, depending upon the molecular structure of the monomer as well as upon the extent of polymerization. In general, the polymers are transparent and colorless and upon complete polymerization, a resin which is substantially insoluble and infusible at atmospheric pressure is produced. In the ultimate state the polymers are substantially unaffected by acids, alkalies, water and organic solvents. Intermediate polymers having a wide range of properties may be secured. Upon the initial polymerization of liquid monomers or solutions of the monomers in suitable solvents, an increase in the viscosity of the liquids is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing substantial portions of polymers which are insoluble in the monomer and organic solvents, and containing as well, a substantial portion of soluble material which may be monomer and/or soluble fusible polymer. These gels are soft and bend readily. However, they are fragile and crumble or tear under low stresses. They may be further polymerized in the presence of catalysts to the final infusible insoluble state.

The monomers may be cast polymerized directly to the insoluble, infusible state. This procedure is subject to certain inherent difficulties due to the reduction in volume during the polymerization. Ofter during polymerization strains are established in the hardening gel which frequently result in fractures as the final hard form is attained. It has been discovered that these difficulties may be avoided by releasing the strains established in the gel. This may be done by interrupting the polymerization at an intermediate stage and permitting the strains to be relieved or by conducting polymerization under conditions which permit gradual release of these strains. For example, the polymerization may be conducted in a simple mold until a soft firm gel has formed. At this point the polymerization may be interrupted and the shaped polymer freed from the mold to which it adheres strongly. When released the polymer contracts substantially thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the decomposition of the peroxide catalyst. This temperature is dependent upon the catalyst used. For benzoyl peroxide, temperatures of 65 to 80° C. are suitable, while for acetone peroxide, temperatures of 140 to 150° C. may be used. This soft sheet of gel is then freed of the mold and in accordance with one modification, the gel may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air or other polymerization inhibitor. Thus, a sheet is produced which is hard and smooth on one side while being soft and tacky on the other. The sheet may then be finished by coating the tacky side with monomer or syrupy polymer and polymerizing it in contact with a smooth plate to the infusible, insoluble state. Often it is found desirable to release the polymer from the plate one or more times during polymerization of the coating in order to minimize formation of cracks or other surface defects. Further details of this process may be found in an application for Letters Patent Serial No. 392,111, filed May 6, 1941, by Vincent Meunier, now U. S. Patent No. 2,370,562, issued February 27, 1945.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, removal from exposure to ultraviolet light, by adding inhibiting materials such as pyrogallol, hydroquinone, aniline, phenylene diamine, or sulphur or by destruction of the polymerization catalyst. The fusible polymer may be separated from all or part of the monomer by any of several methods. It may be precipitated by the addition of nonsolvents for the fusible polymer such as water, ethyl alcohol, methyl alcohol or glycol. Alternatively, it may also be separated from the monomer by distillation in the presence of an inhibitor for polymerization, and preferably, at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the polymers are produced by heating the monomer or a solution thereof in the presence of 2–5 percent of benzoyl peroxide until the viscosity of the solution has increased about 100 to 500 percent. This may require from one-half to two hours while heating at 65–85° C. in the presence of benzoyl peroxide. The resulting viscous solution is poured into an equal volume of water, methyl or ethyl alcohol, glycol or other nonsolvent for the fusible polymer. A polymer usually in the form of a powder or a gummy precipitate is thus formed which may be filtered and dried. This permits substantially complete separation of a soluble fusible polymer from unpolymerized monomer.

Often, however, such complete separation may not be desirable since hazy products may be secured upon further polymerization. Accordingly, it is often desirable to produce compositions comprising the fusible polymer and the monomer. This may be effected by partial distillation or extraction of monomer from the polymer, or by reblending a portion of the fusible polymer with the same or a different polymerizable monomer. In general, the composition should contain at least 40 percent and preferably in excess of 50 percent fusible polymer and from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone or other solvent which normally dissolves vinyl polymers.

Other polymerization methods may involve the interruption of the polymerization while the polymer is a gel. For example, a soft solid gel containing a substantial proportion of fusible polymer may be digested with a quantity of solvent for the fusible polymer to extract the fusible gel from the infusible. The solution may then be treated as above described to separate the fusible polymer from the solvent. These polymers may be used as molding or coating compositions. Due to their solubility they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohol, polyallyl alcohol, polymethallyl alcohol, etc., and then polymerizing to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of 1–5 percent of benzoyl peroxide generally in a heated mold. The polymers may be mixed with fillers such as alpha cellulose, wood pulp and other fibrous substances, mineral fillers or pigments such as zinc oxide or calcium carbonate, lead chromate, magnesium carbonate, calcium silicate, etc., plasticizers such as the saturated alcohol esters of phthalic acid, camphor, the saturated alcohol esters of maleic, fumaric, succinic, and adipic acids or di- or triethylene glycol bis (butyl carbonate). The polymeric molding powder may be copolymerized with phenolic, cellulose acetate, urea, vinylic, protein or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tetrachloride, phenyl cellosolve, dichlorethyl ether, dibutyl phthalate or mixtures thereof is useful as a liquid coating composition. Objects of paper, metal, wood, cloth, leather or synthetic resins may be coated with the solution of polymer in solvent and subsequently polymerized to yield attractively finished coatings. Similarly, porous objects of felt, cloth, leather, paper, etc., either in single layers or laminated may be impregnated with the dissolved fusible polymer and subjected to the polymerization to the final insoluble, infusible state.

Although the present invention has been described in detail with respect to certain specific examples, it is not intended that these details shall be limitations upon the scope of the invention accept to the extent incorporated in the claim. This application is a continuation-in-part of Serial No. 361,280, filed October 15, 1940, by Irving E. Muskat and Franklin Strain.

We claim:

A compound having the structure:

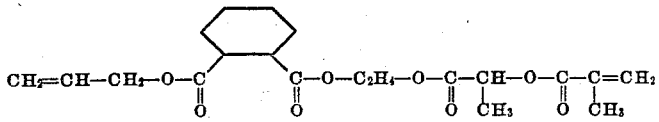

IRVING E. MUSKAT.
FRANKLIN STRAIN.